(12) United States Patent
Franchet et al.

(10) Patent No.: US 9,120,189 B2
(45) Date of Patent: Sep. 1, 2015

(54) METHOD OF MAKING A PIECE OF METAL REINFORCEMENT

(75) Inventors: Jean-Michel Patrick Maurice Franchet, Paris (FR); Gilles Charles Casimir Klein, Mery sur Oise (FR); Gilbert Michel Marin Leconte, Ozoir la Ferriere (FR); Dominique Magnaudeix, Yerres (FR)

(73) Assignee: SNECMA, Paris (FR)

( * ) Notice: Subject to any disclaimer, the term of this patent is extended or adjusted under 35 U.S.C. 154(b) by 259 days.

(21) Appl. No.: 13/978,809

(22) PCT Filed: Dec. 9, 2011

(86) PCT No.: PCT/FR2011/052921
§ 371 (c)(1),
(2), (4) Date: Jul. 9, 2013

(87) PCT Pub. No.: WO2012/095574
PCT Pub. Date: Jul. 19, 2012

(65) Prior Publication Data
US 2013/0283586 A1    Oct. 31, 2013

(30) Foreign Application Priority Data

Jan. 10, 2011 (FR) ..................... 11 50167

(51) Int. Cl.
*B23P 15/04* (2006.01)
*F01D 5/14* (2006.01)
*B21D 53/78* (2006.01)
(Continued)

(52) U.S. Cl.
CPC ................. *B23P 15/04* (2013.01); *B21D 53/78* (2013.01); *B23K 20/021* (2013.01); *F01D 5/147* (2013.01);
(Continued)

(58) Field of Classification Search
CPC .... B21D 26/021; B21D 53/78; B23K 20/021; B23P 15/04; F01D 5/147; F04D 29/324; F05D 2240/121; F05D 2240/122; F05D 2240/034; F05D 2240/303; Y02T 50/67; Y02T 50/672; Y10T 29/4981
See application file for complete search history.

(56) References Cited

U.S. PATENT DOCUMENTS 4,010,530 A    3/1977   Delgrosso et al.
4,706,361 A    11/1987  Meyer et al.
(Continued)

FOREIGN PATENT DOCUMENTS

EP    0 192 105    8/1986
EP    1 574 270    9/2005
FR    2 319 008    2/1977

OTHER PUBLICATIONS

International Search Report Issued Feb. 27, 2012 in PCT/FR11/052921 Filed Dec. 9, 2011.
U.S. Appl. No. 13/980,412, filed Jul. 18, 2013, Klein, et al.
U.S. Appl. No. 14/402,182, filed Nov. 19, 2014, Leconte, et al.

*Primary Examiner* — Alexander P Taousakis
(74) *Attorney, Agent, or Firm* — Oblon, McClelland, Maier & Neustadt, L.L.P.

(57) ABSTRACT

The invention provides a method of making a piece of metal reinforcement for mounting on the leading or trailing edge of a composite turbine engine blade, the method comprising the steps consisting in positioning two metal sheets (1) on either side of a core (2), in shaping the sheets (1) on the core (2) by hot isostatic compression, and in cutting the sheets (1) in order to separate the reinforcement along at least one line of cut and in order to release the core. The core (2) has projecting sacrificial zones (13), with the sheets (1) being cut along the sacrificial zones (13) without degrading the remainder of the core (2).

20 Claims, 4 Drawing Sheets

(51) Int. Cl.
  *B23K 20/02* (2006.01)
  *F04D 29/02* (2006.01)
  *F04D 29/32* (2006.01)

(52) U.S. Cl.
  CPC ............ *F04D 29/023* (2013.01); *F04D 29/324* (2013.01); *B23K 2201/001* (2013.01); *F05D 2240/121* (2013.01); *F05D 2240/122* (2013.01); *F05D 2240/303* (2013.01); *F05D 2240/304* (2013.01); *Y02T 50/67* (2013.01); *Y02T 50/672* (2013.01); *Y10T 29/4981* (2015.01)

(56) References Cited

U.S. PATENT DOCUMENTS

| | | | |
|---|---|---|---|
| 2004/0184921 A1* | 9/2004 | Schreiber | 416/229 R |
| 2005/0278950 A1 | 12/2005 | Despreaux et al. | |
| 2007/0020105 A1* | 1/2007 | Albrecht et al. | 416/224 |
| 2013/0185938 A1* | 7/2013 | Dambrine et al. | 29/889.71 |
| 2013/0294920 A1* | 11/2013 | Klein et al. | 416/229 A |
| 2013/0309096 A1* | 11/2013 | Le Bras et al. | 416/229 A |

* cited by examiner

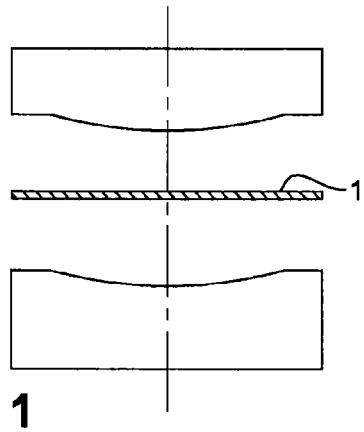
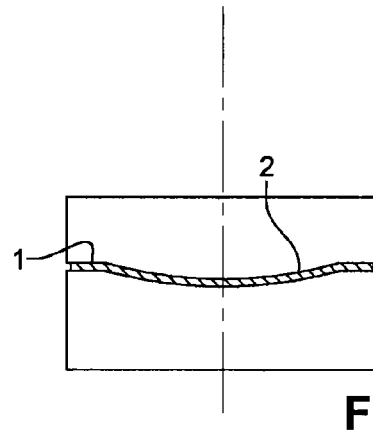
Fig. 1
Fig. 2
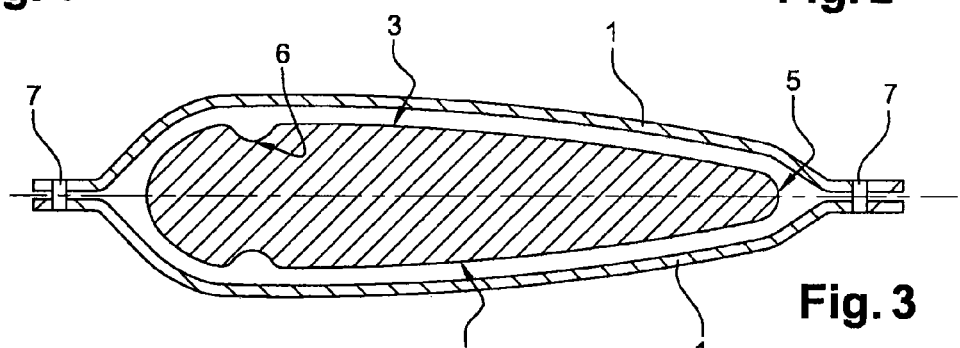
Fig. 3
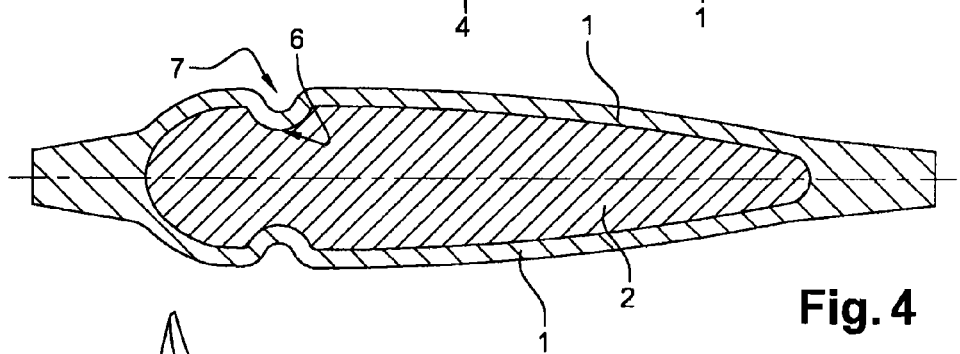
Fig. 4
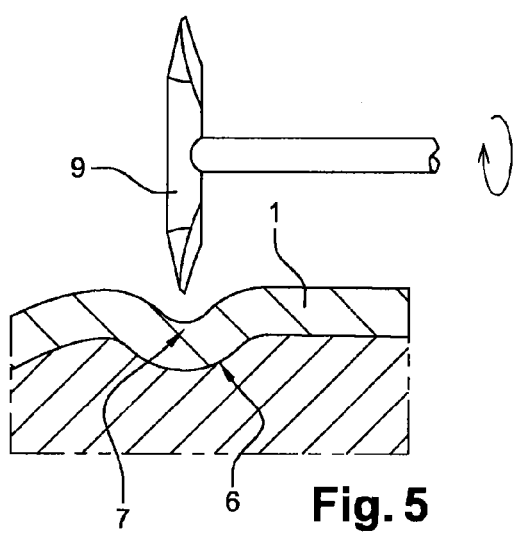
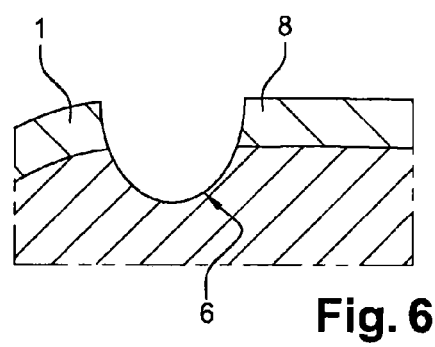
Fig. 5
Fig. 6

METHOD OF MAKING A PIECE OF METAL REINFORCEMENT

CROSS REFERENCE TO RELATED APPLICATIONS

The present application is a 35 U.S.C. §371 national stage patent application of International patent application PCT/FR2011/052921, filed on Dec. 9, 2011, published as WO/2012/095574 on Jul. 19, 2012, the text of which is incorporated by reference, and claims the benefit of the filing date of French application no. 1150167, filed on Jan. 10, 2011, the text of which is also incorporated by reference.

The present invention relates to a method of making a piece of metal reinforcement for mounting on the leading or trailing edge of a composite turbomachine blade such as a fan blade of an airplane turboprop or turbojet.

In order to reduce the cost and the weight of turbine engine fan blades, they are generally made of composite material. Fan blades need to withstand high levels of stress and impact, given their speed of rotation and the impacts that occur against foreign bodies or particles that might penetrate into the air stream. That is why composite blades are projected at their leading and/or trailing edges by pieces of metal reinforcement that are adhesively bonded to the airfoils of the blades.

Document EP 1 574 270-A1 in the name of the Applicant describes a method of making a piece of reinforcement by superplastic forming and diffusion bonding (SPF/DB), consisting in:
  bonding two metal sheets together by diffusion bonding so as to obtain a preform, portions of each of the sheets being covered in an anti-diffusion substance in order to prevent them from bonding together in determined zones;
  curving and twisting the preform;
  inflating the preform so that it is subjected to superplastic forming; and
  cutting the preform so as to obtain the piece of reinforcement.

That method does not make it possible to control accurately the inside shape of the cavity in the reinforcement. In particular, the junction zones between the sheets form zones of stress concentration and of rupture initiation that weaken the reinforcement.

In order to improve the mechanical strength of the reinforcement, patent application FR 10/51992 filed in the name of the Applicant and not yet published proposes a method of making a piece of metal reinforcement that consists in:
  shaping two metal sheets by stamping in order to approximate the final shape of the reinforcement that is to be made;
  positioning the two sheets on either side of a core reproducing the inside shapes of the pressure side and the suction side of the piece of reinforcement;
  assembling the two sheets together around the core under a vacuum and in leaktight manner;
  shaping the sheets onto the core by hot isostatic compression; and
  cutting the sheets to separate the reinforcement and release the core.

The hot isostatic compression of the sheets serves to cause the sheets to take on the shape of the core and to obtain a large radius of curvature in the junction zone between the sheets, thereby avoiding any zone in which stresses are concentrated or rupture is initiated.

The core has two longitudinal grooves situated in two opposite faces of the core. During the hot isostatic compression, the metal of the sheets creeps and fills the grooves of the core, thereby forming two longitudinally-extending depressions in the outside surfaces of the sheets that can be seen from the outside and that form lines of cut. The operator thus knows where to cut the sheets in order to separate the reinforcement and release the core.

The tool for cutting the sheets comes into contact with the bottoms of the above-mentioned grooves in the core and machines them away to a greater or lesser depth. Once the core has released it is generally reused for shaping other pieces of reinforcement. Because of the successive machining operations on the bottoms of the grooves, the number of times a core can be reused is limited.

The invention seeks in particular to provide a solution to this problem that is simple, effective, and inexpensive.

To this end, the invention provides a method of making a piece of metal reinforcement for mounting on the leading or trailing edge of a composite turbomachine blade, the method comprising the steps consisting in:
  shaping two metal sheets so as to approximate the final shape of the piece of reinforcement that is to be made;
  positioning the two sheets on either side of a core reproducing the inside shapes of the suction side and of the pressure side of the piece of reinforcement;
  assembling the two sheets together around the core under a vacuum and in leaktight manner;
  shaping the sheets on the core by hot isostatic compression; and
  cutting the sheets to separate the piece of reinforcement along at least one line of cut, and to release the core;
  the method being characterized in that it consists in forming projecting sacrificial zones on the core, the sheets being shaped to match the sacrificial zones during the hot isostatic compression, and the sheets being cut along the sacrificial zones without degrading the remainder of the core.

The projecting sacrificial zones are thus machined away progressively on each use of the core without degrading the remainder of the core, thereby increasing the number of times it is possible to use the core. These sacrificial zones can also be replaced, if they are constituted by elements that are fitted onto the core, or they can be reconstituted, e.g. by building out material by using an electrode.

According to a characteristic of the invention, the core has two opposite sacrificial zones arranged on either side of the core and defining two opposite lines of cut.

In an implementation, the sheets are cut using a cutter tool that is brought up to the surfaces of the sheets for cutting perpendicularly, outside portions of the sacrificial zones being machined away during said cutting.

In another implementation, cutting is performed with the help of a cutter tool that is brought up to the projecting zone laterally, a lateral portion of each sacrificial zone being machined away during said cutting.

The sacrificial zones may be integral with the core or they may be constituted by inserts of metallic or ceramic material. Preferably, the inserts are received at least in part in cavities formed in the core.

Advantageously, during an operation of cutting the sheets, 2% to 10% of the sacrificial zones are machined away.

The sheets may be cut with the help of a cutter, e.g. with the help of an engraving cutter.

In preferred manner, since the sacrificial zones project, the sheets are shaped so as to present hollow zones that are positioned on the projections of the sacrificial zones before the sheets are assembled around the core.

This enables the sheets to match more closely the shape of the core after hot isostatic compression. The projecting and recessed zones also form means for positioning the sheets relative to the core.

The invention can be better understood and other details, characteristics, and advantages of the invention appear on reading the following description made by way of non-limiting and with reference to the accompanying drawings, in which:

FIGS. 1 and 2 are diagrams showing the step of shaping metal sheets in the prior art method;

FIG. 3 is a diagram of the step of assembling the metal sheets around the core in the prior art;

FIG. 4 is a diagram showing the step of shaping the metal sheets on the core in the prior art isostatic hot pressing and the step of cutting the sheets to separate the reinforcement and release the core;

FIGS. 5 and 6 are diagrams showing the cutting of a metal sheet in accordance with the prior art method;

Figure 7:
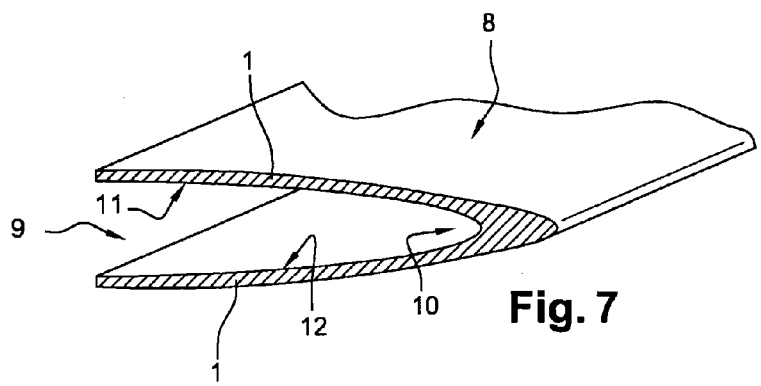
FIG. 7 is a perspective view of a portion of the reinforcement obtained by performing the prior art method.

FIG. 1 shows a step of hot stamping metal sheets 1 in order to shape them to approximate the final shape of the pieces of reinforcement that are to be made. At the end of this shaping, each metal sheet 1 has a concave zone 2 defining a recess. The sheets 1 are made of titanium-based alloy, e.g. of TA6V. The shaping step is performed at a temperature of about 950° C.

As shown in FIG. 3, two identical sheets 1 are then placed facing each other on either side of a core 2, the concave sides of the sheets 1 each housing a portion of the core 2.

The core 2 has a first face 3 reproducing the inside shape of the pressure side of the piece of reinforcement that is to be made, and a second face 4 reproducing the inside shape of the suction side of the piece of reinforcement.

The connection zone between the two faces, i.e. the corresponding side edge 5 of the core 2 has a radius of curvature that varies along the piece of reinforcement over the range 1 millimeter (mm) to 5 mm, with each of the faces 3 and 4 of the core including a longitudinal groove 6 for a function that is described more fully below.

The core 2 is made of a refractory material into which titanium does not diffuse and it is made out of a metal alloy that presents a coefficient of expansion that is very different from that of the titanium sheets 1, e.g. it is made of IN100.

The object is to avoid any adhesion between the sheets 1 and the core 2 during the various operations that are performed, and in particular during the operation of hot isostatic compression, and to facilitate extracting the core.

For this purpose also, the core 2 may be passivated by being covered in an anti-diffusion barrier that is not contaminating for the metal material of the sheets 1, e.g. yttrium oxide.

Once the sheets 1 have been put into place around the core 2, they are assembled together at their periphery by tack welding (not shown in the figures) and by tungsten inert gas (TIG) welding so that they are bonded together and held in position. The assembly is then placed in a vacuum enclosure in order to weld the sheets 1 together over their entire periphery, e.g. by electron beam (EB) welding. The continuous peripheral weld bead 7 provides sealing for the cavity formed between the sheets 1.

As shown in FIG. 3, the sheets 1 are then shaped against the core 2 by hot isostatic compression during which the sheets 1 are subjected to an external pressure of about 1000 bars, to a temperature of about 940° C., and for a duration of about 2 hours, for sheets 1 that are made of titanium TA6V alloy.

During this operation, the sheets 1 deform so as to take on exactly the shape of the core 2, including in the connection zone 5 of the core 2. In this zone in particular, the sheets 1 join together while fitting closely to the rounded shape of the core 2. In addition, the metal of the sheet 1 creeps and fills in the grooves 6 in the core so as to form two longitudinal depressions 7 in the outside surfaces of the sheets 1, that are visible from the outside and that forms lines of cut. In parallel, because of the high temperature and because of external pressure applied, the two sheets 1 are diffusion bonded together.

Thereafter, the reinforcement 8 is separated by cutting the sheets 1 along the lines of cut, e.g. using a cutter or a grindwheel 9 (FIGS. 5 and 6). The tool 9 for cutting the sheets also machines the bottoms of the corresponding grooves 6, thereby degrading the core 2 and limiting the extent to which it can be reused for making other pieces of reinforcement 8.

Excess peripheral material is removed by cutting along trimming lines. Finally, finishing machining serves to give the piece of reinforcement the desired outside shape.

A piece of reinforcement 8 is thus obtained that presents the shape shown in FIG. 7, in which the junction between the two sheets 1 that has been made by diffusion bonding provides mechanical characteristics that are equivalent to those of a single-piece part. The cavity 9 in the reinforcement 8 also includes, at the junction zone 10 between the pressure side 11 and the suction side 12, a radius of curvature that is large enough to avoid generating stress concentrations and cracking in use.

The method of the invention differs from that described above essentially in that it consists in forming projecting sacrificial zones on the core 2.

Since the sacrificial zones project, the sheets 1 can be shaped so as to present hollow zones that are positioned on the projections of the sacrificial zones before the sheets 1 are assembled around the core.

Figure 8:
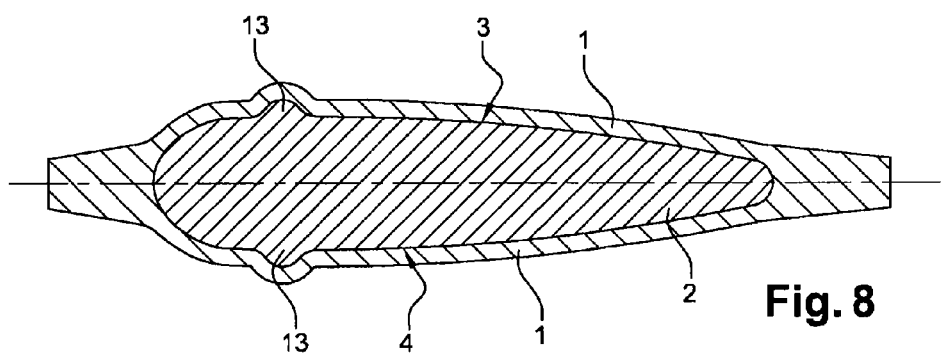
FIGS. 8 to 10 are views corresponding respectively to FIGS. 4 to 6 and showing a first implementation of the method of the invention.
Figure 9:
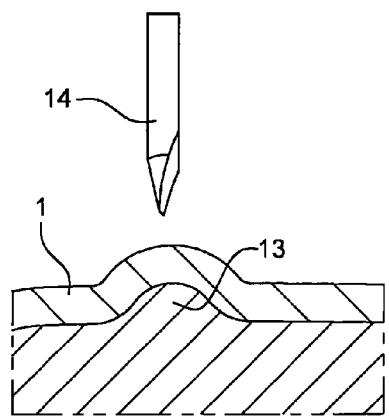

In a first implementation shown in FIG. 8, the grooves in the core are replaced by longitudinal projecting sacrificial zones 13 that are situated on opposite faces 3 and 4 of the core.

As can be seen in FIG. 8, the sheets 1 are shaped to match the sacrificial zone 13 during the hot isostatic compression.

Figure 10:
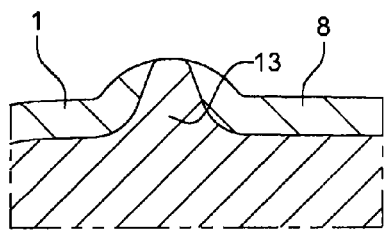
Figure 11:
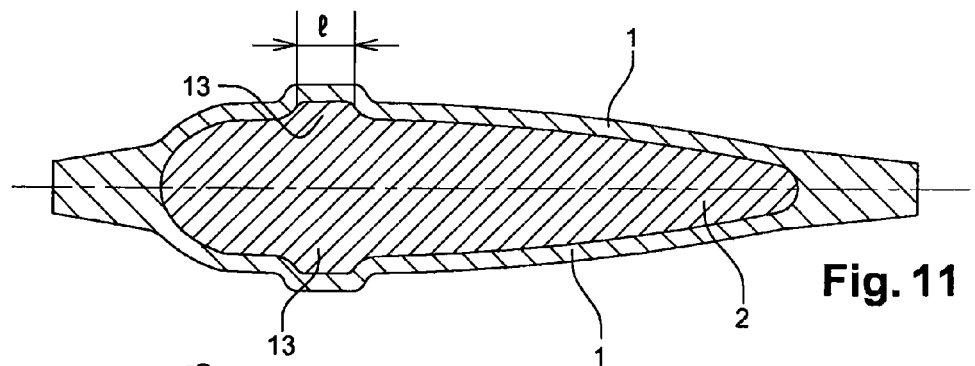
FIG. 11 is a view corresponding to FIG. 4 and showing a second implementation of the method of the invention.
Figure 12:
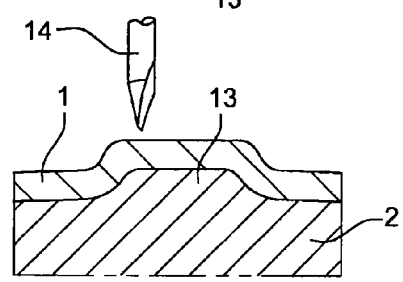
FIGS. 12 to 15 are diagrams showing the cutting of a metal sheet in accordance with the second implementation of the method of the invention.
Figure 22:
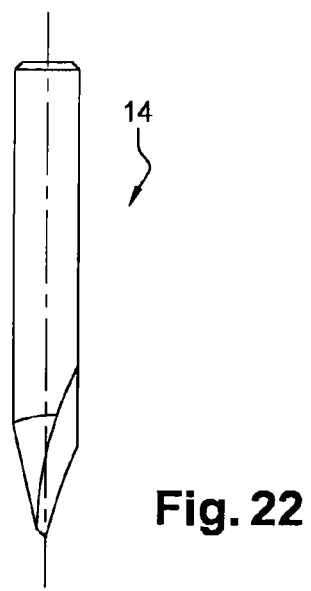
FIG. 22 is a face view of an engraving cutter used for cutting the metal sheets.

The sheets 1 are cut using a cutter tool, e.g. using an engraving cutter 14 (FIG. 22), a conventional grindwheel or a grinder, which is brought up to the surfaces of the sheets 1 that are to be cut perpendicularly, an external portion of each of the sacrificial zones 13 being machined away during said cutting (FIG. 10).

In particular, during each cutting operation, 2% to 10% of the sacrificial zones 13 are machined away.

By way of example, the height of the projecting zone 13 lies in the range 3 mm to 5 mm, and each cutting operation leads to this zone 13 being machined down by about 0.2 mm, thus enabling the core 2 to be reused 15 to 25 times in order to form other pieces of reinforcement 8. When the sacrificial zones 13 have been machined away completely or for the most part, they may be regenerated, e.g. by building out material using an electrode, thus making it possible to further increase the lifetime of the core 2.

In a second implementation shown in FIGS. 11 to 14, the sacrificial zone 13 presents a width l lying in the range 10 mm to 20 mm, for example.

The sheets 1 are cut using a cutter tool 14 that is brought up to the surfaces of the sheets 1 that are to be cut perpendicularly, an external portion of each sacrificial zone 13 being machine away during said cutting. The advance of the tool may be pressure controlled, the material of the core generally being not as hard as the material of the sheets. Pressure control makes it possible to avoid machining the zones 13 of the core 2 excessively while cutting the sheets 1.

Figure 13:
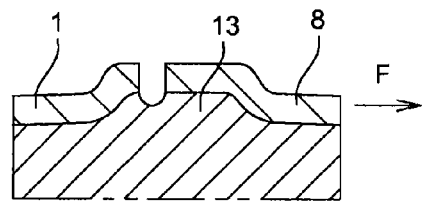

Thereafter, the reinforcement 8 may be separated from the core in the direction of arrow F in FIG. 13.

During a second use of the core, the sheets 1 are cut in the same manner as before, the cutting zone nevertheless being offset laterally from the preceding cutting zone towards the portions of the sheets 1 that are to form the reinforcement 8. This offset serves to avoid machining the same portions of the sacrificial zones 13 on each occasion, thereby increasing the lifetime of the core.

Figure 14:
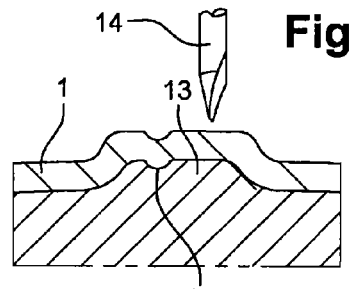
Figure 15:
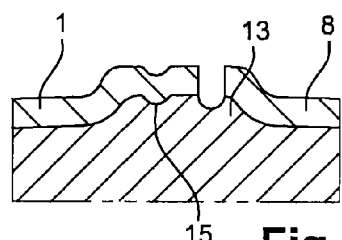

This offset towards the reinforcement 8 also serves to facilitate separating the reinforcement 8 from the core 2. Machining a portion of a sacrificial zone 13 generates a cavity 15 into which the corresponding sheet 1 will creep when making the next piece of reinforcement 8, as shown in FIG. 14, which would make it more difficult to remove the piece of reinforcement 8 if the offset were to be performed in the opposite direction.

Figure 16:
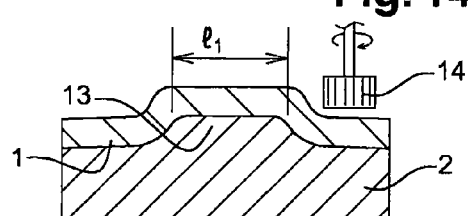
FIGS. 16 to 18 are diagrams showing the cutting of a metal sheet in accordance with a third implementation of the method of the invention.
Figure 17:
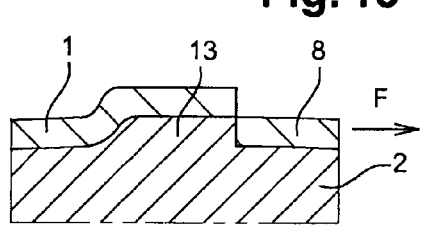
Figure 18:
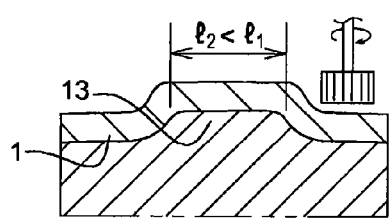

In a third implementation shown in FIGS. 16 to 18 the sacrificial zones 13 present a width $l_1$ lying in the range 10 mm to 20 mm, for example.

The sheets 1 are cut using a cutter tool 14, in this example a conventional grindwheel, and it is brought up laterally (horizontally in the drawing) relative to the projecting zone 13, a lateral portion of each sacrificial zone 13 being machined away during said cut so that the width of the sacrificial zones 13 is reduced to the width $l_2$, e.g. 0.2 mm less than the width $l_1$. Thereafter, the reinforcement 8 can be separated from the core 2 in the direction of arrow F in FIG. 17.

The core 2 can then be reused, as shown in FIG. 18, with the width of the zones 13 being progressively reduced on each new cut.

Figure 19:
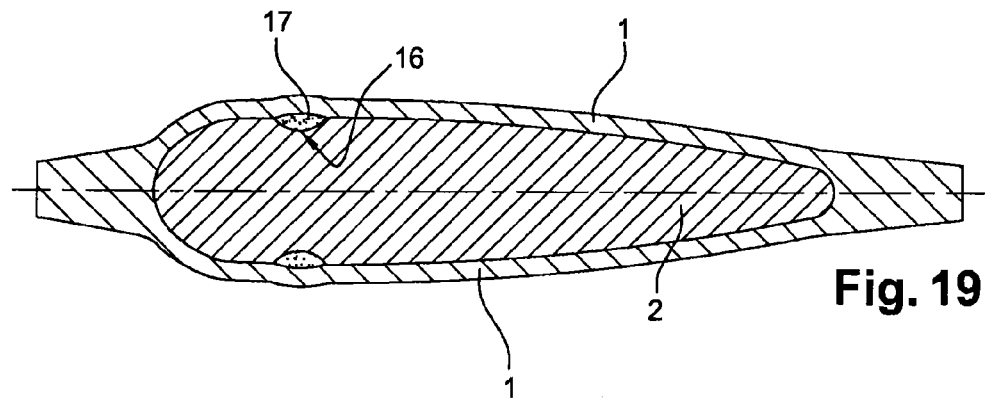
FIGS. 19 to 21 are views corresponding respectively to FIGS. 4 to 6 of a fourth implementation of the method of the invention.
Figure 20:
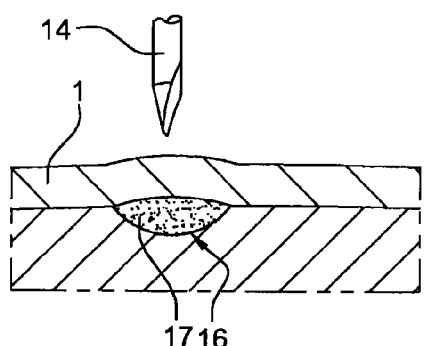
Figure 21:
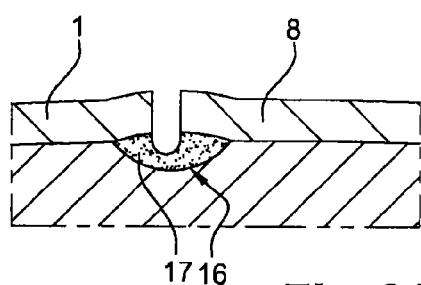

FIGS. 19 to 21 show a fourth implementation of the invention in which the core 2 has longitudinal grooves 16 housing longitudinal inserts 17 of metallic or ceramic material. By way of example, the inserts 17 may be round wires and they project from the outside surface of the core 2.

In this way, it is only the inserts 17 that are machined by the tool 14 when cutting the sheets 1, such that the core 2 is not degraded and can be reused. The inserts 17 need to be changed after one or more cuts. The inserts 17 are made of a material that is easy to machine and that presents a coefficient of expansion that is close to that of the core 2, so as to avoid any degradation of the core when the assembly is subjected to high temperature.

The invention claimed is:

1. A method of making a piece of metal reinforcement, the method comprising:
    shaping two metal sheets so as to approximate a final shape of the piece of reinforcement that is to be made;
    positioning the two metal sheets on either side of a core reproducing an inside shape of a suction side and of a pressure side of the piece of reinforcement;
    assembling the two sheets together around the core under a vacuum and in a leaktight manner;
    shaping the sheets on the core by hot isostatic compression; and
    cutting the sheets to separate the piece of reinforcement along at least one line of cut, and to release the core;
    wherein the method comprises forming projecting sacrificial zones on the core, the sheets being shaped to match the sacrificial zones during the hot isostatic compression, and the sheets being cut along the sacrificial zones without degrading a remainder of the core.

2. The method of claim 1, wherein the core has two opposite sacrificial zones arranged on either side of the core and defining two opposite lines of cut.

3. The method of claim 1, wherein the sheets are cut using a cutter tool that is brought up to surfaces of the sheets for cutting perpendicularly, outside portions of the sacrificial zones being machined away during the cutting.

4. The method of claim 1, wherein the core is formed with a projecting sacrificial zone, and cutting is performed by using a cutter tool that is brought up to the projecting zone laterally, lateral portions of the sacrificial zones being machined away during the cutting.

5. The method of claim 1, wherein the sacrificial zones are integral with the core.

6. The method claim 1, wherein the sacrificial zones are formed by inserts of a metallic material or a ceramic material.

7. The method of claim 6, wherein the inserts are received at least in part in grooves formed in the core.

8. The method of claim 1, wherein, during an operation of cutting the sheets, 2% to 10% of the sacrificial zones are machined away.

9. The method of claim 1, wherein the sheets are cut by using a cutter.

10. The method of claim 1, wherein the sacrificial zones project, and the sheets are shaped so as to present hollow zones that are positioned on the projections of the sacrificial zones before the sheets are assembled around the core.

11. The method of claim 2, wherein the sheets are cut using a cutter tool that is brought up to surfaces of the sheets for cutting.

12. The method of claim 2, wherein the core is formed with a projecting sacrificial zone, and cutting is performed by using a cutter tool that is brought up to the projecting zone laterally, lateral portions of the sacrificial zones being machined away during the cutting.

13. The method of claim 2, wherein the sacrificial zones are integral with the core.

14. The method of claim 3, wherein the sacrificial zones are integral with the core.

15. The method of claim 4, wherein the sacrificial zones are integral with the core.

16. The method of claim 11, wherein the sacrificial zones are integral with the core.

17. The method of claim 2, wherein the sacrificial zones are formed by inserts of a metallic material or a ceramic material.

18. The method of claim 3, wherein the sacrificial zones are formed by inserts of a metallic material or a ceramic material.

19. The method of claim 4, wherein the sacrificial zones are formed by inserts of a metallic material or a ceramic material.

20. The method of claim 11, wherein the sacrificial zones are formed by inserts of a metallic material or a ceramic material.

* * * * *